United States Patent
Williams, Jr.

(10) Patent No.: US 8,910,751 B2
(45) Date of Patent: Dec. 16, 2014

(54) BEARING LUBRICATION SYSTEM

(75) Inventor: Warner H. Williams, Jr., Lakeland, FL (US)

(73) Assignee: Flanders Electric Motor Service, Inc., Evansville, IN (US)

( * ) Notice: Subject to any disclaimer, the term of this patent is extended or adjusted under 35 U.S.C. 154(b) by 582 days.

(21) Appl. No.: 12/795,948

(22) Filed: Jun. 8, 2010

(65) Prior Publication Data

US 2011/0297484 A1  Dec. 8, 2011

(51) Int. Cl.
  *F16N 7/38* (2006.01)
  *F16N 7/40* (2006.01)
  *F16N 7/22* (2006.01)
  *F16N 29/02* (2006.01)
  *F01M 5/02* (2006.01)

(52) U.S. Cl.
  CPC .. *F16N 7/40* (2013.01); *F16N 7/22* (2013.01); *F16N 29/02* (2013.01); F01M 2005/026 (2013.01); F16N 2210/14 (2013.01); F16N 2270/30 (2013.01); F16N 2270/70 (2013.01)
  USPC ............................................... 184/6.1

(58) Field of Classification Search
  USPC .................... 184/6.1, 6.3, 6.4, 6.14, 6.28, 7.4
  See application file for complete search history.

(56) References Cited

U.S. PATENT DOCUMENTS

| | | | | |
|---|---|---|---|---|
| 4,445,168 A * | 4/1984 | Petryszyn | ........................ | 700/21 |
| 4,480,718 A * | 11/1984 | Marinelli | .................... | 184/103.1 |
| 4,738,336 A * | 4/1988 | Smith et al. | ..................... | 184/6.4 |
| 5,129,482 A * | 7/1992 | Warner et al. | ............... | 184/104.3 |
| 5,137,117 A * | 8/1992 | Mangen et al. | ................. | 184/7.4 |
| 5,182,720 A * | 1/1993 | Beck et al. | ..................... | 700/282 |
| 5,318,152 A * | 6/1994 | Ehlert | .......................... | 184/6.26 |
| 5,330,636 A * | 7/1994 | Reichert | ....................... | 210/96.1 |
| 5,733,048 A * | 3/1998 | El-Ibiary et al. | ............... | 384/399 |
| 6,216,822 B1 * | 4/2001 | May et al. | ................... | 184/105.1 |
| 6,374,950 B1 * | 4/2002 | Takeno | .......................... | 184/7.4 |
| 6,498,956 B1 * | 12/2002 | Yang | .............................. | 700/14 |
| 6,527,085 B1 * | 3/2003 | Paczuski | ...................... | 184/6.16 |
| 6,561,316 B1 * | 5/2003 | Graf et al. | ..................... | 184/38.4 |
| 6,622,824 B2 * | 9/2003 | Roehrborn | ..................... | 184/6.1 |
| 6,705,431 B2 * | 3/2004 | Matsuura et al. | .............. | 184/7.4 |
| 6,777,022 B2 * | 8/2004 | Sekine et al. | ...................... | 427/8 |
| 6,820,724 B2 * | 11/2004 | Sekine et al. | ................... | 184/5.1 |
| 7,017,712 B1 * | 3/2006 | Rake et al. | ...................... | 184/6.4 |
| 7,237,652 B2 * | 7/2007 | Takanohashi et al. | ........ | 184/6.12 |
| 7,500,311 B2 * | 3/2009 | Shimomura | ................... | 29/898.1 |
| 2004/0059542 A1 * | 3/2004 | Apostolides | .................. | 702/182 |
| 2008/0110700 A1 * | 5/2008 | Yanohara et al. | .............. | 184/7.4 |
| 2011/0297484 A1 * | 12/2011 | Williams, Jr. | ................... | 184/6.1 |

* cited by examiner

*Primary Examiner* — William E Dondero
*Assistant Examiner* — Mark K Buse
(74) *Attorney, Agent, or Firm* — Fennemore Craig, P.C.

(57) ABSTRACT

A bearing lubrication system for providing supplemental lubrication to a bearing mounted within a bearing housing may include a pump having an inlet and an outlet. The inlet of the pump is fluidically connected to a lubricating fluid sump, whereas the outlet of the pump is fluidically connected to the bearing. A pump control system operatively connected to the pump operates the pump on an intermittent basis to provide a controlled amount of lubricating fluid to the bearing.

5 Claims, 4 Drawing Sheets

BEARING LUBRICATION SYSTEM

TECHNICAL FIELD

This invention relates to bearing lubrication systems in general and more specifically the lubrication of sleeve bearings.

BACKGROUND

Sleeve bearing systems are well-known in the art and are used in a wide variety of machine systems to support rotating shafts. A typical sleeve bearing installation is a hydrodynamic system, in which a thin film of lubricating fluid, typically a petroleum-based or synthetic oil, forms a thin film or fluid "wedge" that provides support for a shaft rotating within the sleeve bearing. In a passively lubricated sleeve bearing system, a sump provided in the bearing housing contains the lubricating fluid (e.g., oil) for the bearing. One or more oil rings encircling the shaft are caused to rotate by the rotation of the shaft in the sleeve bearing. As the oil ring rotates, its lower portion dips into the oil contained in the sump. Continued rotation of the oil ring carries some of the lubricating oil to the top of the sleeve bearing, where it is deposited at or near the bearing/shaft interface. Thus, the oil ring provides the sleeve bearing with a continuous supply of lubricating fluid so long as the shaft is rotating.

While ring oiling systems of the type described above work well and are widely used, they only supply lubricant to the sleeve bearing when the shaft is rotating. The bearing is not supplied with lubricant during those times when the shaft is not rotating.

SUMMARY OF THE INVENTION

A bearing lubrication system for providing supplemental lubrication to a bearing mounted within a bearing housing may include a pump having an inlet and an outlet. The inlet of the pump is fluidically connected to a lubricating fluid sump, whereas the outlet of the pump is fluidically connected to the bearing. A pump control system operatively connected to the pump operates the pump on an intermittent basis to provide a controlled amount of lubricating fluid to the bearing.

Also disclosed is a machine system that includes a rotatable shaft, a housing having a lubricating fluid sump therein, a bearing positioned within the housing, and a pump having an inlet end and an outlet end. The inlet end of the pump is fluidically connected to the lubricating fluid sump in the housing, whereas the outlet of the pump is operatively associated with the bearing so that lubricating fluid from the pump is provided to the bearing. A pump control system operatively connected to the pump operates the pump in response to a lubrication signal to provide a controlled amount of lubricating fluid to the bearing.

A method for lubricating a bearing in a machine may comprise the steps of: Sensing an operational state of the machine; and providing a controlled amount of a lubricating fluid to the bearing based on the sensed operational state of the machine.

Also disclosed is a bearing lubrication retro-fit kit that includes: A pump having an inlet and an outlet; a first fluid conduit having an inlet end and an outlet end, the inlet end of the first fluid conduit being sized to connect to the outlet of the pump, the outlet end of the first fluid conduit being sized to operatively engage a lubrication port provided on the bearing; a second fluid conduit having an inlet end and an outlet end, the outlet end of the second fluid conduit being sized to connect to the inlet of the pump, the inlet end of the second fluid conduit being sized to operatively engage a port provided in a lubricating fluid sump associated with the bearing; and a pump control system for operating the pump on an intermittent basis to provide a controlled amount of lubricating fluid to the bearing.

BRIEF DESCRIPTION OF THE DRAWINGS

Illustrative and presently preferred exemplary embodiments of the invention are shown in the drawings in which.

DETAILED DESCRIPTION OF THE PREFERRED EMBODIMENTS

Figure 1:
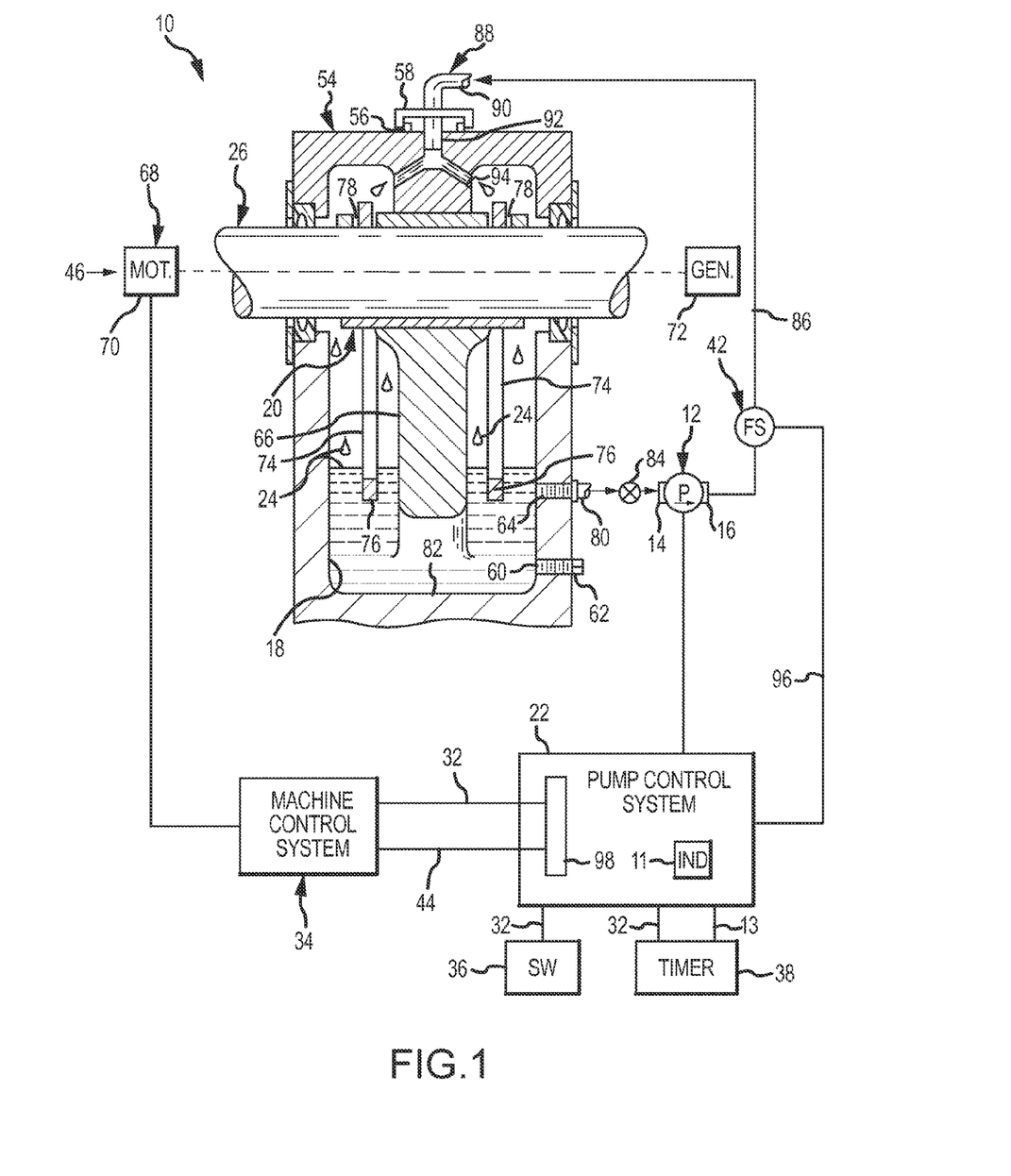
FIG. 1 is a pictorial representation of one embodiment of a bearing lubrication system according to the present invention as it may be used in conjunction with a sleeve bearing system having ring-type oilers.

A bearing lubrication system 10 according to one embodiment of the invention is best seen in FIG. 1 and may comprise a pump 12 having an inlet 14 and an outlet 16. The inlet 14 of pump 12 is fluidically connected to a lubricating fluid sump 18, whereas the outlet 16 of pump 12 is fluidically connected to a bearing 20. A pump control system 22 operatively connected to the pump 12 operates the pump 12 on an intermittent basis to provide a controlled amount of lubricating fluid 24 to the bearing 20.

Figure 2:
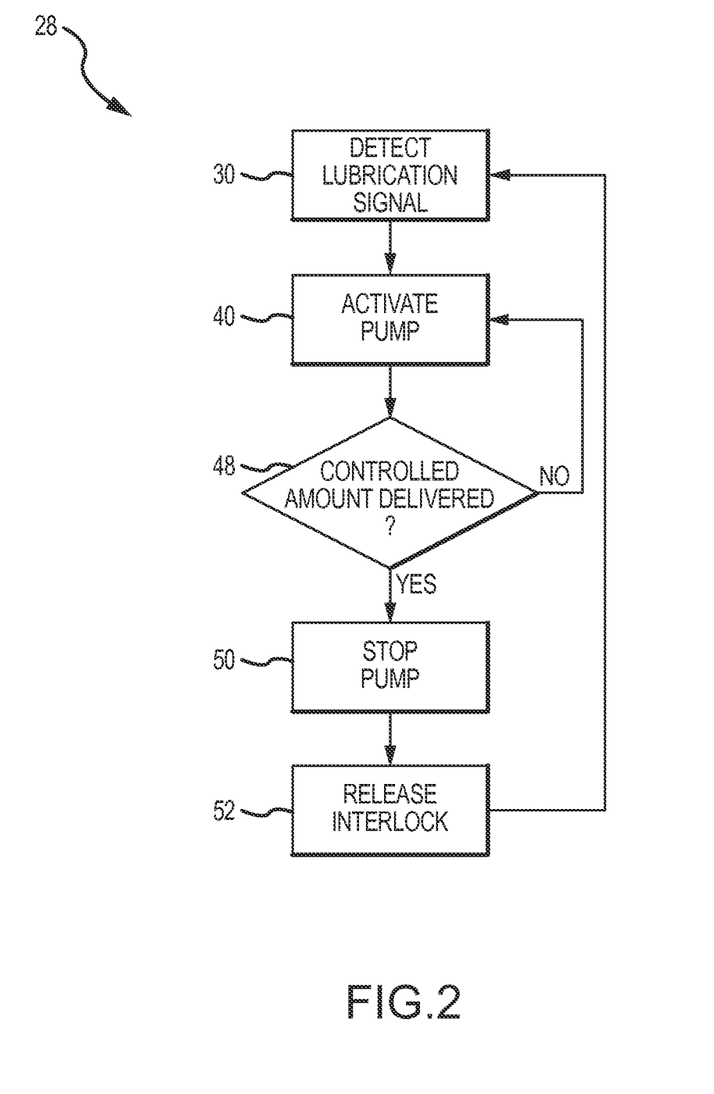
FIG. 2 is a flow diagram of one embodiment of a method for lubricating a bearing.

Referring now to FIGS. 1 and 2 simultaneously, bearing lubrication system 10 may be operated in accordance with process 28 to provide a controlled amount of lubricating fluid 24 to bearing 20. A first step 30 in process 28 involves detecting a lubrication signal 32 (FIG. 1). As will be described in greater detail below, lubrication signal 32 may comprise any of a wide range of signals that are interpreted or regarded by pump control system 22 as a call to deliver a controlled amount of lubricating fluid 24 to bearing 20. For example, the lubrication signal 32 may comprise a start-up signal produced by a machine control system 34 operatively connected to pump control system 22. That is, the provision of the controlled amount of lubricating fluid 24 to bearing 20 is based on a sensed operational state of the machine. Alternatively, the lubrication signal 32 could be provided by other systems and/or devices. For example, lubrication signal 32 could originate from a switch 36 operatively connected to pump control system 22. Switch 36 may be activated by a system operator (not shown) in order to command the bearing lubrication system 10 to provide a controlled amount of lubricating fluid 24 to bearing 20. Lubrication signal 32 may also originate from a timer 38 operatively associated with pump control system 22.

Regardless of the particular system or device that provides the lubrication signal 32 to pump control system 22, once pump control system 22 receives a lubrication signal 32, it will activate pump 12 at step 40. Pump 12 will then begin to pump lubricating fluid 24 from sump 18 to bearing 20. Pump 12 will continue to pump lubricating fluid 24 to the bearing 20 until a controlled or desired amount of lubricating fluid 24 has been provided to the bearing 20. By way of example, in one operational scenario, the controlled amount of lubricating fluid 24 that is delivered to bearing 20 is about 177 ml (about 6 fluid ounces), although a greater or lesser controlled amount may be delivered depending on the particular application and machine.

In one embodiment, a flow sensor 42 operatively associated with pump 12 may be used to sense a flow of lubricating fluid 24 from pump 12. Flow sensor 42 may be used by control system 22 as a means for managing or controlling an interlock signal 44 that may be provided to machine control system 34. For example, once flow sensor 42 detects a flow of lubricating fluid 24, pump control system 22 may release the interlock signal 44, thereby allowing or authorizing machine control system 34 to start a machine 46 being controlled thereby. In addition, flow sensor 42 may also be used as a means for controlling the amount of lubricating fluid 24 provided to bearing 20, although other arrangements are possible, as will be described in further detail herein.

Once the pump 12 has delivered the desired or controlled amount of lubricating fluid 24 to bearing 20, as determined at step 48, pump control system 22 will then stop or deactivate pump 12 at step 50. If control system 22 is configured or set up to provide an interlock signal 44 (e.g., to machine control system 34), then the interlock signal 44 may be released at step 52, thereby signaling the machine control system 34 to allow rotation of shaft 26. Thereafter, the process or method 28 may return to step 30 and await the detection of another lubrication signal 32.

In the particular embodiment shown and described herein, the bearing lubrication system 10 is configured to provide the controlled amount of lubricating fluid 24 to bearing 20 immediately prior to machine start-up, thereby ensuring that bearing 20 is provided with lubrication when shaft 26 begins to rotate in bearing 20. When operated in this way, bearing lubrication system 10 functions as a bearing pre-lubrication system to pre-lubricate the bearing 20 before machine operation. However, the bearing lubrication system 10 according to the present invention is not limited to use as a bearing pre-lubrication system and can also be used to provide a controlled amount of lubricating fluid 24 to bearing 20 in other circumstances and for other purposes, many of which are described herein and others of which will become apparent to persons having ordinary skill in the art after having become familiar with the teachings provided herein. It should be noted that the provision of such additional controlled amounts of lubricating fluid 24 may be performed instead of or in addition to the bearing pre-lubrication function.

For example, in another configuration, pump control system 22 may provide a controlled amount of lubricating fluid 24 to bearing 20 on a periodic basis (e.g., during machine operation) to provide additional amounts of lubricating fluid to bearing 20. Significantly, the controlled amount of lubricating fluid 24 may be the same as or different from the controlled amount provided during the pre-lubrication function, if such pre-lubrication functionality is to be provided. In still another arrangement, the bearing lubrication system 10 may be configured to provide a controlled amount of lubricating fluid 24 on a "demand" basis, e.g., when the bearing 20 is subjected to high loadings, such as may occur when the machine is being operated at high and/or extreme duty cycles, or in other circumstances wherein it would be desirable to provide supplemental lubrication to bearing 20. Several exemplary conditions and/or situations that may trigger or cause pump control system 22 to provide the controlled amount of lubricating fluid 24 to bearing 20 will be described in further detail herein.

A significant advantage of the bearing lubrication system of present invention is that it may be used to provide a controlled amount of lubricating fluid 24 to the bearing 20 in any of a wide range of conditions and circumstances. For example, in one embodiment, the bearing lubrication system 10 is configured to provide the controlled amount of lubricating fluid 24 before machine start-up, thereby ensuring that bearing 20 will be provided with sufficient lubrication before it will be subjected to loading. Such a pre-lubrication function can be used to significant advantage in passively-lubricated sleeve bearing systems.

More specifically, while sleeve type bearing systems are designed to be passively lubricated during operation (e.g., via the provision of a ring-type oiler), such passively lubricated bearing systems are not capable of providing lubrication when idle (e.g., when the shaft is not rotating). Instead, such systems must rely on residual lubrication (e.g., the presence of residual amounts of lubricating fluid remaining between the bearing 20 and shaft 26) to provide lubrication during start-up. However, such residual lubrication may be inadequate, particularly if the equipment has been idle for an extended period of time.

Partly in an effort to address this problem, many such bearing systems are provided with manual oiling ports that allow a system operator or maintenance technician to manually add lubricating fluid (e.g., oil) to the bearing before machine start-up. While such manual oiling procedures would seem to work well in theory, they have proven considerably more difficult to effectively implement in practice.

For example, in order to be effective such manual oiling procedures require the operator to provide the required lubricant to each bearing system before machine start-up. Any bearings that are missed by the operator (i.e., not manually oiled) will not be provided with the required start-up lubrication. In addition, such a process may be less than effective if an excessive amount of time elapses between the manual oiling operation and machine start-up. This time delay problem can be significant in machine systems having multiple bearings, each of which must be manually oiled before system start-up.

Still other problems arise from such manual oiling procedures. For example, such procedures require the operator to provide the bearing system with the proper type (e.g., grade) and quantity of lubricant. The provision of the bearing with improper lubricant type or grade may cause excessive bearing wear or create other problems. If too little lubricant is provided, it may drain from the bearing before start-up, leaving the bearing inadequately lubricated. On the other hand, if too much lubricant is provided during the manual oiling procedure, excess lubricant may leak past the bearing seals and contaminate other parts of the machine system with unwanted lubricant.

Moreover, such manual lubrication procedures are not well-suited for use in sump-type sleeve bearing systems. That is, the periodic addition of start-up lubricant will eventually overfill the sump, therefore requiring the bearing sump to be periodically drained to avoid overfilling. Of course, any lubricant spilled during the manual lubrication process or periodic draining of the sump can also create problems.

Partly in an effort to address some of the problems associated with such manual oiling procedures, numerous types of so-called automatic oilers have been developed for sleeve bearing systems. A typical automatic oiler comprises a small oil reservoir or cup that is positioned above the bearing. A small orifice or wick is then used to provide a slow but continuous flow of oil to the bearing.

While such automatic oilers are commonly used, they are also not without their problems. For example, a continuous supply of oil is not required by passively-lubricated sleeve bearing systems during operation, thereby making the automatic oiler superfluous. In addition, the slow but gradual addition of oil by the oiler will gradually accumulate in the bearing sump, requiring that it be periodically drained to maintain the proper oil level in the sump. While automatic lubricators have been developed with a valve between the reservoir and bearing that can be cycled to provide lubricant only when the valve is open, such systems still suffer the disadvantage in that the additional oil continues to accumulate in the bearing sump. In addition, the oiler reservoir must be topped-off from time to time to ensure that the automatic oiler can continue to provide lubrication to the bearing. Of course, such systems are also subject to problems if the improper type or grade of oil is added to the reservoir.

The bearing lubrication system according to the present invention provides significant advantages over the manual and automatic oiling systems just described. For example, the bearing lubrication system 10 of the present invention may be set up or configured to automatically provide a controlled amount of lubricating fluid 24 to the bearing 20 during a machine start-up sequence. Consequently, the bearing lubrication system 10 of the present invention will ensure that the bearing system (i.e., bearing 20 and shaft 26) will always receive the appropriate amount of lubrication before machine start-up. In addition, the control system 22 may be connected to multiple pumps 12 associated with multiple bearings, thereby allowing a controlled amount of lubricating fluid to be simultaneously provided to multiple bearings of a machine system. Consequently, machine systems having multiple sleeve bearings can be easily and rapidly pre-lubricated, substantially simultaneously. Still further, the present invention is not limited to the provision start-up lubrication to the bearing system, and can be easily programmed or configured to provide periodic lubrication or "on-demand" lubrication where appropriate or desired.

Still other advantages are associated with the fact that the bearing lubrication system 10 draws lubricating fluid 24 from the existing bearing sump instead of a separate reservoir. First, operation of the bearing lubrication system 10 will not add additional amounts of lubricating fluid 24 to the bearing sump 18 over time. The present invention therefore eliminates the concern that the sump will become overfilled and dispenses with the need to periodically drain the sump to maintain the proper level of lubricating fluid. Second, by using the lubricating fluid 24 from bearing sump 18, there is no concern that the improper lubricant type and/or grade may be erroneous added to the bearing system.

Yet another advantage of the present invention is that the bearing lubrication system 10 draws the lubricating fluid 24 from an elevated level in the sump 18. The bearing lubrication system 10 therefore minimizes the likelihood that contaminants (e.g., dirt and/or wear particles) in the lubricating fluid 24 will be supplied to the bearing 20. The bearing lubrication system 10 supplies substantially clean or contaminant-free lubricating fluid 24 to bearing 20.

Having briefly described the bearing lubrication system 10 according to the present invention, as well as some of its more significant features and advantages, various exemplary embodiments of the bearing lubrication system 10 will now be described in detail. However, before proceeding with the description, it should be noted that while the bearing lubrication system 10 is shown and described herein as it could be used in conjunction with certain types of sleeve bearings in certain applications, the bearing lubrication system 10 of the present invention could be used in conjunction with any of a wide range of bearing types and in any of a wide range of applications or situations, as would become apparent to persons having ordinary skill in the art after having become familiar with the teachings provided herein. Consequently, the present invention should not be regarded as limited to the particular bearing types, machine systems, and applications shown and described herein.

Referring back now primarily to FIG. 1, one embodiment of the bearing lubrication system 10 is shown as it may be used to provide a controlled amount of lubricating fluid 24 to one or more bearings 20 provided in a machine system 46. As will be described in further detail below, the controlled amount of lubricating fluid 24 may be provided to bearing 20 before machine start-up, thereby providing a bearing pre-lubrication function. In addition, the bearing lubrication system 10 shown and described herein may be configured to provide a controlled amount of lubricating fluid 24 to bearing 20 on a periodic basis and/or on a demand basis.

Machine system 46 may comprise any of a wide range of systems used in any of a wide variety of applications having one or more bearings that could benefit from the delivery, from time-to-time, of a controlled amount of lubricant. Consequently, the present invention should not be regarded as limited to any particular type of machine system used in any particular application. However, by way of example, in the particular embodiment shown and described herein, the machine system 46 may comprise a motor-generator system 68 having a motor 70 that is connected to a generator 72 by a shaft 26 that is supported for rotation by one or more bearings 20. Machine system 46 may be controlled, at least in part, by a machine control system 34 in a manner that will be described in greater detail below.

In the particular embodiments shown and described herein, bearing 20 may comprise a sleeve-type bearing that is housed or contained within a bearing housing or pedestal 54. Bearing 20 may be supported by suitable bearing flanges 66 provided within bearing pedestal 54, as best seen in FIG. 1. Bearing pedestal 54 may also define a sump 18 therein for holding a quantity of lubricating fluid 24.

Sump 18 may be provided with various access ports or openings therein for allowing the lubricating fluid 24 to be added to and removed from the sump 18. For example, in the particular embodiment illustrated in FIG. 1, bearing sump 18 may be provided with a filler opening or neck 56 that is located above bearing 20, although other arrangements are possible. Filler neck 56 may be used to fill the sump 18 with the desired amount of lubricating fluid 24. Filler neck 56 may be provided with a filler cap 58 to close-off the filler neck 56. As will be described in further detail below, filler cap 58 illustrated in FIG. 1 may comprise a modified filler cap that allows it to function in conjunction with bearing lubrication system 10.

Bearing sump 18 may also be provided with a drain port 60 to allow lubricating fluid 24 to be drained from the sump 18. A drain plug 62 may be used to close the drain port 60. Sump 18 may also be provided with a sight-glass port 64 configured to receive a sight glass (not shown) to allow the level of the lubricating fluid 24 contained in sump 18 to be readily ascertained. In the particular embodiment shown and described herein, the sight glass is removed and the bearing lubrication system 10 is fluidically connected to the sight glass port 64.

As already described, bearing 20 may comprise a sleeve-type bearing that is sized to receive shaft 26 for rotation therein. Bearing 20 may be provided with one or more oil rings 74 to provide passive lubrication for the bearing 20 during machine operation. Oil rings 74 have inside diameters that are considerably greater than the outside diameter of shaft 26, so that the lower portions 76 thereof extend into the lubricating fluid 24 provided in sump 18. A pair of slots 78 may be provided in bearing 20 to axially constrain the oil rings 74. Rotation of shaft 26 during operation of the machine system 46 (e.g., motor-generator set 68), causes oil rings 74 to rotate. As the oil rings 74 rotate, the lower portions 76 thereof dip into the lubricating fluid 24 provided in sump 18 and carry some of the lubricating fluid 24 to the top of bearing 20. A portion of the lubricating fluid 24 is thus deposited at or near the bearing/shaft interface. Oil rings 74 thereby provide bearing 20 and shaft 26 with substantially continuous lubrication during operation.

In the particular embodiment shown and described herein, bearing lubrication system 10 is configured to be readily adapted to bearing housing 54, e.g., as a "retro-fit" kit. The bearing housing 54 shown and described herein represents a fairly common configuration for sleeve-type bearing systems that are passively oiled by ring-type oilers. In this particular embodiment, then, the bearing lubrication system 10 comprises a pump 12 having an inlet 14 and an outlet 16. Pump 12 may comprise any of a wide range of pumps that are well-known in the art or that may be developed in the future that are, or would be, suitable for the particular application. Consequently, the present invention should not be regarded as limited to any particular type of pump 12. However, by way of example, in one embodiment, pump 12 may comprise an electric (e.g., 24-volt DC), self-priming, diaphragm-type pump. Pump 12 may also include an integral check valve (not shown) to prevent lubricating fluid 24 from flowing back into sump 18 when the pump 12 is not operating.

Inlet 14 of pump 12 is fluidically connected to sump 18 by a suitable fluid conduit or inlet line 80. In the particular embodiment shown and described herein, the fluid conduit or inlet line 80 is connected to the sight glass port 64 (the sight glass having first been removed). The elevated location of the sight glass port 64 (i.e., with respect to the bottom 82 of sump 18) minimizes the likelihood that lubricating fluid 24 drawn from sump 18 will contain contaminants. Fluid conduit or inlet line 80 may be provided with a valve 84 to permit easy servicing of the system 10, although such a valve 84 is not required.

Outlet 16 of pump 12 may be fluidically connected to bearing 20 via a suitable fluid conduit or outlet line 86. Outlet line 86 delivers the controlled amount of lubricating fluid 24 to bearing 20. In the embodiment shown and described herein, i.e., wherein the bearing lubrication system 10 comprises a retro-fit "kit," a replacement filler cap 58 may be provided that includes a filler tube 88. An inlet end 90 of filler tube 88 may be adapted to receive the outlet line 86, whereas a discharge end 92 of filler tube 88 may be configured to align with or be received by a bearing lubrication port 94 provided in bearing housing 54.

Bearing lubrication system 10 may also include or be provided with a flow sensor 42 positioned in outlet line 86, although flow sensor 42 may be positioned at other locations (e.g., in inlet line 80). In one embodiment, flow sensor 42 comprises a flow switch that is switchable between first and second states depending on whether a flow of lubricating fluid 24 is detected. Control system 22 monitors or senses the state of the flow switch 42 to determine whether the bearing lubrication system 10 is providing lubricating fluid 24 to bearing 20. However, in another embodiment, flow sensor 42 may comprise a flow meter for sensing an amount (e.g., volume) of lubricating fluid 24 provided to bearing 20. In such an alternate embodiment, control system 22 could then be configured to operate the bearing lubrication system 10 based on the actual volume of lubricating fluid 24 provided to bearing 20. That is, the volume of lubricating fluid 24, as measured by flow sensor 42, will be used to determine when the controlled amount of lubricating fluid 24 has been provided to bearing 20.

Pump control system 22 controls or operates pump 12 on an intermittent basis to provide the controlled amount of lubricating fluid 24 to bearing 20. Pump control system 22 is operatively connected to pump 12 and flow sensor 42. Pump control system 22 may also be provided with an interface 98 to allow pump control system 22 to interact with the machine control system 34. In the particular embodiment shown and described herein, pump control system 22 may also be operatively associated with a switch 36 and a timer 38. Switch 36 and timer 38 may be used to provide a lubrication signal 32 to pump control system 22 in a manner that will be described in greater detail herein.

Pump control system 22 may also be provided with an indicator 11 for providing an indication to a system operator that pump 12 is providing lubricating fluid 24 to bearing 20. By way of example, in one embodiment, indicator 11 may comprise an incandescent lamp or a light emitting diode (LED), thus will provide a visual indication. Alternatively, of course, other systems and devices may be used to provide the system operator with an indication that the bearing lubrication system 10 is providing the controlled amount of lubricating fluid 24 to bearing 20.

In an embodiment wherein flow sensor 42 comprises a switch that is closed upon the detection of a flow of lubricating fluid 24 in outlet line 86 (FIG. 1), the indicator 11 (e.g., lamp or LED) may be placed in series with flow sensor 42 and will automatically provide a visual indication without further interaction with pump control system 22. Alternatively, of course, other arrangements are possible, as would become apparent to persons having ordinary skill in the art after having become familiar with the teachings provided herein.

Pump control system 22 may comprise any of a wide range of control systems, such as microprocessor-based control systems or programmable logic controllers (PLC's), that are now known in the art or that may be developed in the future that are, or would be, suitable for controlling and interacting with the various systems and devices in the manner described herein. However, because such control systems are well-known in the art and could be readily provided by persons having ordinary skill in the art after having become familiar with the teachings provided herein, the particular devices and/or systems that may comprise the pump control system 22 will not be described in further detail herein.

Referring now primarily to FIG. 2, with occasional reference to FIG. 1, bearing lubrication system 10 may be operated in accordance with process 28 to provide a controlled amount of lubricating fluid 24 to bearing 20. A first step 30 in process 28 involves detecting a lubrication signal 32 (FIG. 1). As mentioned above, lubrication signal 32 is interpreted or regarded by pump control system 22 as a call to deliver a controlled amount of lubricating fluid 24 to bearing 20. Thus, upon detection of the lubrication signal 32, pump control system 22 will activate pump 12 for a time sufficient for pump 12 to deliver the controlled amount of lubricating fluid 24 to bearing 20.

Lubrication signal 32 may be generated by various systems and devices that are operatively associated with control system 22 and may be detected or otherwise sensed by pump control system 22. For example, in the particular embodiment shown and described herein, lubrication signal 32 may be generated by either or all of machine control system 34, switch 36, and timer 38. In some embodiments, lubrication signal 32 also may be internally generated by control system 22.

In the case where the lubrication signal 32 is produced by the machine control system 34, the lubrication signal 32 may comprise a start-up signal that is produced by the machine control system 34 during a start-up sequence. Stated another way, the lubrication signal 32 relates to a sensed operational state of the machine system 46. Thus, the system 10 will deliver the controlled amount of lubricating fluid 24 based on the sensed operational state of the machine 46. Generally speaking, the particular start-up signal or event that is interpreted by pump control system 22 as the lubrication signal 32 should occur early in a machine start-up sequence or procedure, so that bearing lubrication system 10 will be able to deliver the controlled amount of lubricating fluid 24 to bearing 20 before the machine is started.

Depending on the operational sequence of the particular machine control system 34, it may be possible to use as the sensed lubrication signal 32 some event that occurs early in the machine start-up sequence, so that the lubrication can be provided by system 10 without substantially delaying the overall machine start sequence. In other cases, the particular operational sequence of the machine control system 34 may be such that it is not possible to provide the controlled amount of lubricating fluid 24 to bearing 20 without delaying the start-up sequence. In such cases, it may be desirable to configure the machine control system 34 to be responsive to an interlock signal 44 provided by pump control system 22. Interlock signal 44 will prevent machine start-up until the controlled amount of lubricating fluid 24 has been provided.

The lubrication signal 32 may also be provided by switch 36. Switch 36 thus may function as a manual lubrication switch. That is, switch 36 may be manually activated by a system operator (not shown) to provide manual or "on-demand" lubrication. Such manual lubrication may be initiated regardless of whether the machine 46 is in operation or idle.

In addition, lubrication signal 32 may also be provided by timer 38. More specifically, timer 38 may be configured or programmed to provide lubrication signal 32 on a periodic basis, such as, for example, once an hour or once a day. In such an embodiment, then, the bearing control system 10 will provide the controlled amount of lubricating fluid 24 to bearing 20 on a periodic basis, as established by the operation of timer 38. In some embodiments, timer 38 may also be programmed to provide control system 22 with a stop signal 13 that will cause pump control system 22 to stop pump 12. The stop signal 13 may be provided at some defined period of time after the pump 12 started, thereby serving as an alternate means to allow the system 10 to provide a desired controlled amount of lubricating fluid 24 to bearing 20. Alternatively, such a pump stop signal 13 could be automatically generated internally by the pump control system 22 within some period of time after receiving or sensing the lubrication signal 32. Further, the time delay between receipt of the lubrication signal 32 and the generation of the stop signal 13 (e.g., generated either by timer 38 or internally by pump control system 22) could be user-programmable, thereby allowing the system operator to vary or control the amount of lubricating fluid 24 that is delivered to bearing 20.

Regardless of the particular system or device that provides the lubrication signal 32 to pump control system 22, once pump control system 22 receives a lubrication signal 32, it will activate pump 12 at step 40. Pump 12 will then begin pumping lubricating fluid 24 from sump 18 to bearing 20. In the particular embodiment shown and described herein, flow sensor 42 senses the flow of lubricating fluid 24 from pump 12 and produces an output signal 96 related thereto. If the flow sensor 42 comprises a flow switch, the output signal 96 will be sensed by control system 22 as either an open or closed switch. Control system 22 may also activate indicator 11 when flow is detected, thereby providing the system operator (not shown) with an indication (e.g., a visual indication) that the bearing lubrication system 10 is delivering a controlled amount of lubricating fluid 24 to bearing 20.

In another embodiment wherein flow sensor 42 comprises a flow meter or other type of flow sensor for sensing a volumetric flow of lubricating fluid 24, control system 22 may use the output signal 96 of flow sensor 42 to determine when the pump 12 has delivered the desired controlled amount of lubricating fluid 24 to bearing 12. Control system 22 may also activate indicator 11 during the time the flow of lubricating fluid 24 is being measured to provide a visual indication for a system operator.

The output signal 96 from flow sensor 42 also may be used by control system 22 as a means for managing or controlling the interlock signal 44 that may be provided to machine control system 34. For example, once flow sensor 42 detects a flow of lubricating fluid 24, pump control system 22 may release the interlock signal 44, thereby allowing or authorizing machine control system 34 to start a machine 46 being controlled thereby. Alternatively, control system 22 may be configured to release the interlock signal 44 only after the flow of lubricating fluid 24 has been terminated, i.e., after the entire controlled amount of lubricating fluid 24 has been provided to bearing 20.

Once the pump 12 has delivered the desired or controlled amount of lubricating fluid 24 to bearing 20, as determined at step 48, pump control system 22 will then stop or deactivate pump 12 at step 50. If control system 22 is configured or set up to provide an interlock signal 44 to machine control system 34, then the interlock signal 44 may be released at step 52, thereby signaling the machine control system 34 to allow rotation of shaft 26. Thereafter, the process or method 28 may return to step 30 and await the detection of another lubrication signal 32.

As was briefly described above, in the particular embodiment shown and described herein, the bearing lubrication system 10 is configured to provide the controlled amount of lubricating fluid 24 to bearing 20 immediately prior to machine start-up, thereby ensuring that bearing 20 is provided with lubrication when shaft 26 begins to rotate in bearing 20. When operated in this way, bearing lubrication system 10 functions as a bearing pre-lubrication system to pre-lubricate the bearing 20 before machine operation.

However, the bearing lubrication system 10 according to the present invention is not limited to use as a bearing pre-lubrication system and can also be used to provide a controlled amount of lubricating fluid 24 to bearing 20 in other circumstances and for other purposes. The provision of such additional controlled amounts of lubricating fluid 24 may be performed instead of or in addition to the bearing pre-lubrication process.

For example, in another configuration, bearing lubrication system 10 may be configured to provide a controlled amount of lubricating fluid 24 on a "demand" basis, e.g., when the bearing 20 is subjected to high loadings, such as may occur when the machine is being operated at high and/or extreme duty cycles, or in other circumstances wherein it would be desirable to provide supplemental lubrication to bearing 20. In such a configuration, the lubrication signal 32 may be provided by switch 36, which may be manually activated by a system operator. The controlled amount of lubricating fluid 24 may be the same as or different from the controlled amount that is provided during the pre-lubrication function, if such pre-lubrication functionality is to be provided.

In still yet another configuration, pump control system 22 may provide a controlled amount of lubricating fluid 24 to bearing 20 on a periodic basis (e.g., during machine operation, or even when the machine is not operating) to provide additional amounts of lubricating fluid to bearing 20. In such an arrangement, the lubrication signal 32 may be provided by timer 38. Again, the controlled amount of lubricating fluid 24 may be the same as or different from the controlled amount provided during the pre-lubrication function or that provided during the manual or on-demand lubrication function.

The bearing lubrication system 10 may be operated as follows to provide a controlled amount of lubricating fluid 24 to bearing 20. Consider, for example, an application wherein the machine 46 comprises a motor-generator system 68 having a motor 70 operatively connected to a generator 72 by shaft 26 supported by bearing 20. The motor-generator system 68 may be started by providing a suitable start signal (not shown) to the machine control system 34. Machine control system 34 will then initiate a start-up sequence for the particular machine 46 (e.g., motor-generator system 68) being controlled thereby. At the desired point in the start-up sequence, pump control system 22 will sense a lubrication signal 32, i.e., based on the sensed state of the machine system 46. If so configured, pump control system 22 may also provide an interlock signal 44 to machine control system 34 that will cause machine control system 34 to avoid rotating the shaft 26 until the interlock signal 44 is released.

In the meantime, pump control system 22 will activate pump 12, which will begin delivering or pumping lubricating fluid 24 from sump 18 to bearing 20. The lubricating fluid 24 is drawn from an elevated location in the sump 18, thereby minimizing the likelihood that the lubricating fluid 24 will contain contaminants or other debris that typically collects at the bottom 82 of sump 18. The pump 12 will provide substantially clean lubricating fluid 24 to bearing 20. Flow sensor 42 detects the flow of lubricating fluid 24 in outlet line 86, causing indicator 11 to illuminate, thereby providing the system operator with a visual indication that the lubricating fluid 24 is being delivered to the bearing 20. Pump control system 22 will continue to operate pump 12 until the controlled amount of lubricating fluid 24 has been delivered. By way of example, in one embodiment, the controlled amount of lubricating fluid 24 delivered by the bearing lubrication system 10 is selected to be about 177 ml (about 6 ounces), although any desired amount can be delivered.

As mentioned, the controlled amount of lubricating fluid 24 may be determined by using flow sensor 42 to measure the actual amount of lubricating fluid 24 that is delivered to bearing 20. Alternatively, control system 22 may simply terminate the pumping operation after some period of time, which period can be selected to correspond to the delivery of the desired, i.e., controlled, amount of lubricating fluid 24.

Control system 22 can then release the interlock signal 44 (if provided), allowing machine control system 34 to complete the start-up sequence and allow the shaft 26 to begin rotating within bearing 20. During operation, the oil rings 74 will supply lubricating fluid 24 to bearing 20. If some circumstance develops wherein the system operator perceives a need to provide supplemental lubrication to bearing 20, then the system operator could activate switch 36, which will cause the pump control system 22 to activate pump 12 and deliver a controlled amount of lubricating fluid 24 to bearing 20. The controlled amount may be the same as or different than the controlled amount delivered during the pre-lubrication function. In addition, timer 38 may be programmed to generate lubrication signal 32 on a periodic basis. The bearing lubrication system 10 will then provide controlled amounts of lubricating fluid 24 to bearing 20 on a periodic basis.

Figure 3:
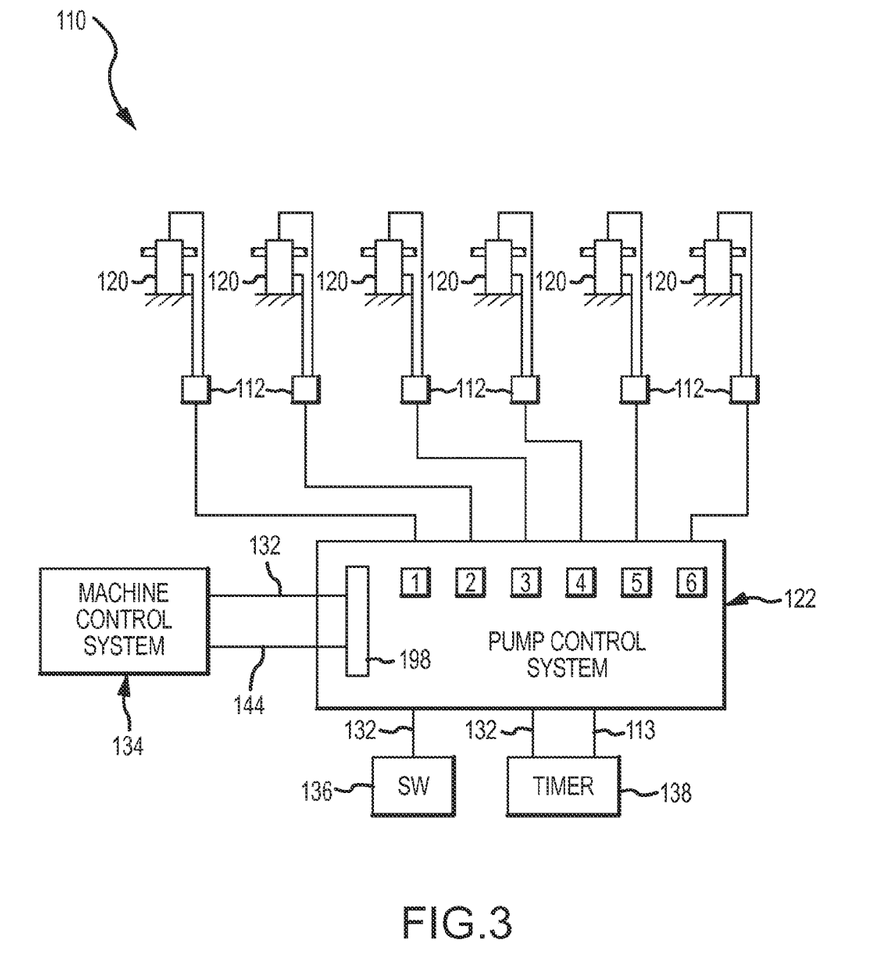
FIG. 3 is a schematic representation of another embodiment of a bearing lubrication system for providing controlled amounts of lubricating fluid to a plurality of bearings.

As mentioned above, the bearing lubrication system 10 may be readily configured to provide lubrication to a plurality of bearing assemblies that may be associated with a single machine system 46 or with multiple machine systems. For example, in another embodiment 110 illustrated in FIG. 3, the bearing lubrication system may be configured to provide a controlled amount of lubrication to six (6) separate bearing assemblies 120. In such an embodiment, the bearing lubrication system 110 may comprise six (6) separate pump assemblies 112, each of which is operatively associated with a corresponding bearing assembly 120. A single pump control system 122 may be connected to each of the pumps 112 and may control the various pumps 112 in the manner already described for the single pump embodiment 10. Pump control system 112 may be provided with an indicator 111 for each pump 112, thereby allowing a system operator to readily confirm that each bearing 120 is being supplied with the controlled amount of lubricating fluid. Pump control system 122 may also be provided with an interface 198 to allow pump control system 122 to operate in conjunction with a machine control system 134 in the manner already described. That is, pump control system 122 may receive a lubrication signal 132 from machine control system 134. Pump control system 122 may also provide an interlock signal 144 to machine control system 134. Of course, pump control system 122 may also be operatively connected to a manual lubrication switch 136 and a timer 138, if desired.

Figure 4:
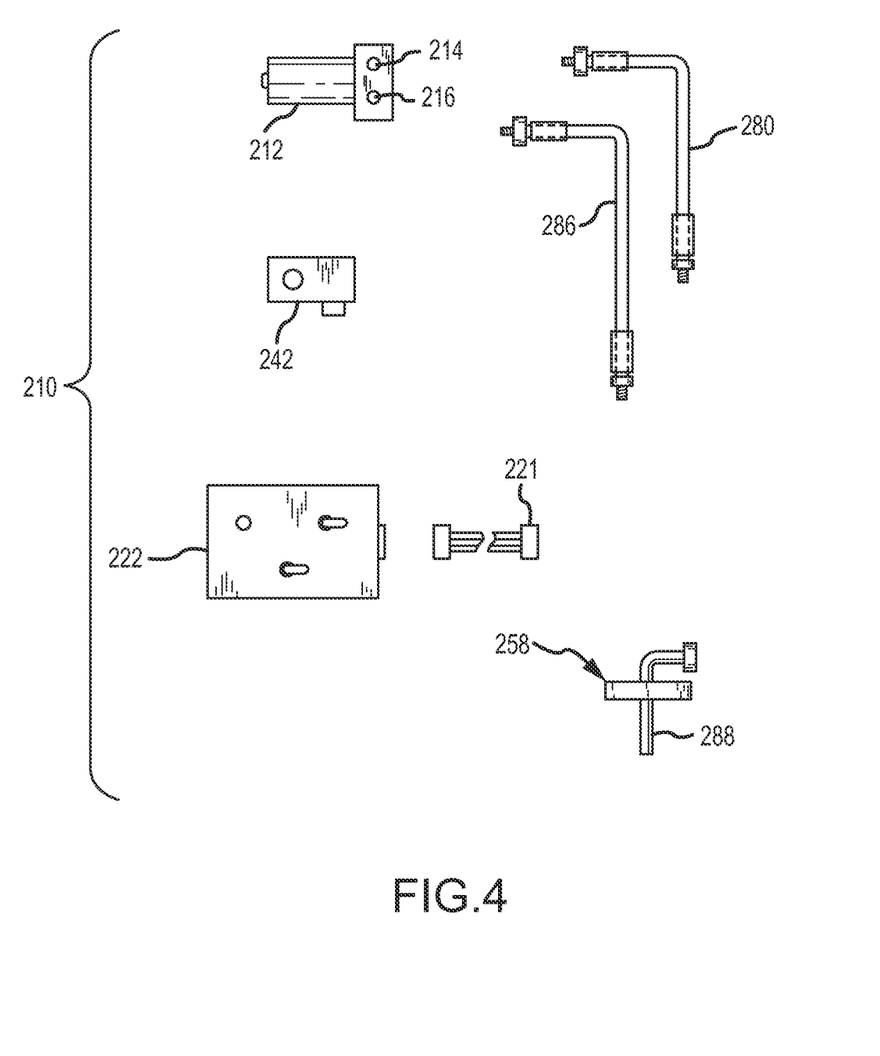
FIG. 4 is a pictorial view of component parts that may be provided in a bearing lubrication retro-fit kit.

Referring now to FIG. 4, the bearing lubrication system 10 may be conveniently provided as a retro-fit kit 210. Retro-fit 210 may comprise all of the components and devices required to allow a system operator to conveniently and readily provide or retro-fit the bearing lubrication system to a machine system having at least one bearing. In one embodiment, the retro-fit kit 210 may comprise one or more pumps 212 having an inlet 214 and an outlet 216. Kit 210 may also comprise one or more fluid inlet lines or conduits 280 configured to fluidically connect the pump inlet 214 to a suitable port (e.g., sight-glass port 64) provided in the bearing sump. Kit 210 may also comprise one or more fluid outlet lines or conduits 286 configured to fluidically connect the pump outlet 216 to a bearing lubrication port (e.g., 94) provided on the bearing housing. In one embodiment, kit 210 may also be provided with one or more filler caps 258, each of which may be provided with a filler tube 288. Filler cap(s) 258 is configured to engage the filler opening or neck (e.g., 56) provided on bearing housing 54. Filler tube 288 is configured to connect to the outlet line 286 and to engage the bearing lubrication port (e.g., 94) in the manner already described. Kit 210 may also be provided with one or more flow sensors 242 configured to be positioned in the outlet line 286 (e.g., between pump outlet 216 and outlet line 286), as well as a control system 222. Depending on the embodiment, kit 210 may be provided with one or more wiring harnesses 221 to allow the control system 222 to be connected to the pump 212, the flow sensor 242, and to the particular machine control system (not shown) that is used in the particular machine installation.

Having herein set forth preferred embodiments of the present invention, it is anticipated that suitable modifications can be made thereto which will nonetheless remain within the scope of the invention. The invention shall therefore only be construed in accordance with the following claims:

What is claimed is:
1. A machine system, comprising:
a rotatable shaft;

a housing having an opening therein, said housing defining a lubricating fluid sump therein;

a bearing positioned within the opening in said housing, said bearing being sized to receive said rotatable shaft, lubricating fluid from said bearing draining into the lubricating fluid sump defined by said housing;

a pump having an inlet and an outlet, the inlet of said pump being fluidically connected to the lubricating fluid sump defined by said housing, the outlet of said pump being operatively associated with said bearing so that lubricating fluid from said pump is provided to said bearing;

a pump control system operatively connected to said pump, said pump control system operating said pump in response to a lubrication signal to provide a controlled amount of lubricating fluid to said bearing; and a machine control system operatively associated with said shaft and said pump control system, said machine control system controlling rotation of said shaft in said bearing, said machine control system producing the lubrication signal for said pump control system during a start-up sequence and operating said pump in response to the lubrication signal to provide the controlled amount of lubricating fluid to said bearing before said machine control system initiates rotation of said shaft in said bearing.

2. The machine system of claim 1, wherein said pump control system produces an interlock signal, said machine control system being responsive to the interlock signal to initiate rotation of said shaft in said bearing after the controlled amount of lubrication fluid has been provided to said bearing.

3. The machine system of claim 1, further comprising a flow switch fluidically connected to the outlet end of said pump and to said pump control system, said pump control system producing the interlock signal based on a sensed state of said flow switch.

4. The machine system of claim 1, further comprising a timer operatively associated with said pump control system, said pump control system operating said pump to provide the controlled amount of lubrication fluid to said bearing in response to signals from said timer.

5. The machine system of claim 4, wherein said timer is adjustable to vary the controlled amount of lubrication fluid provided to said bearing.

\* \* \* \* \*